C. R. RANEY.
BINDING MECHANISM.
APPLICATION FILED MAY 19, 1913. RENEWED JUNE 8, 1916.
1,205,261.
Patented Nov. 21, 1916.
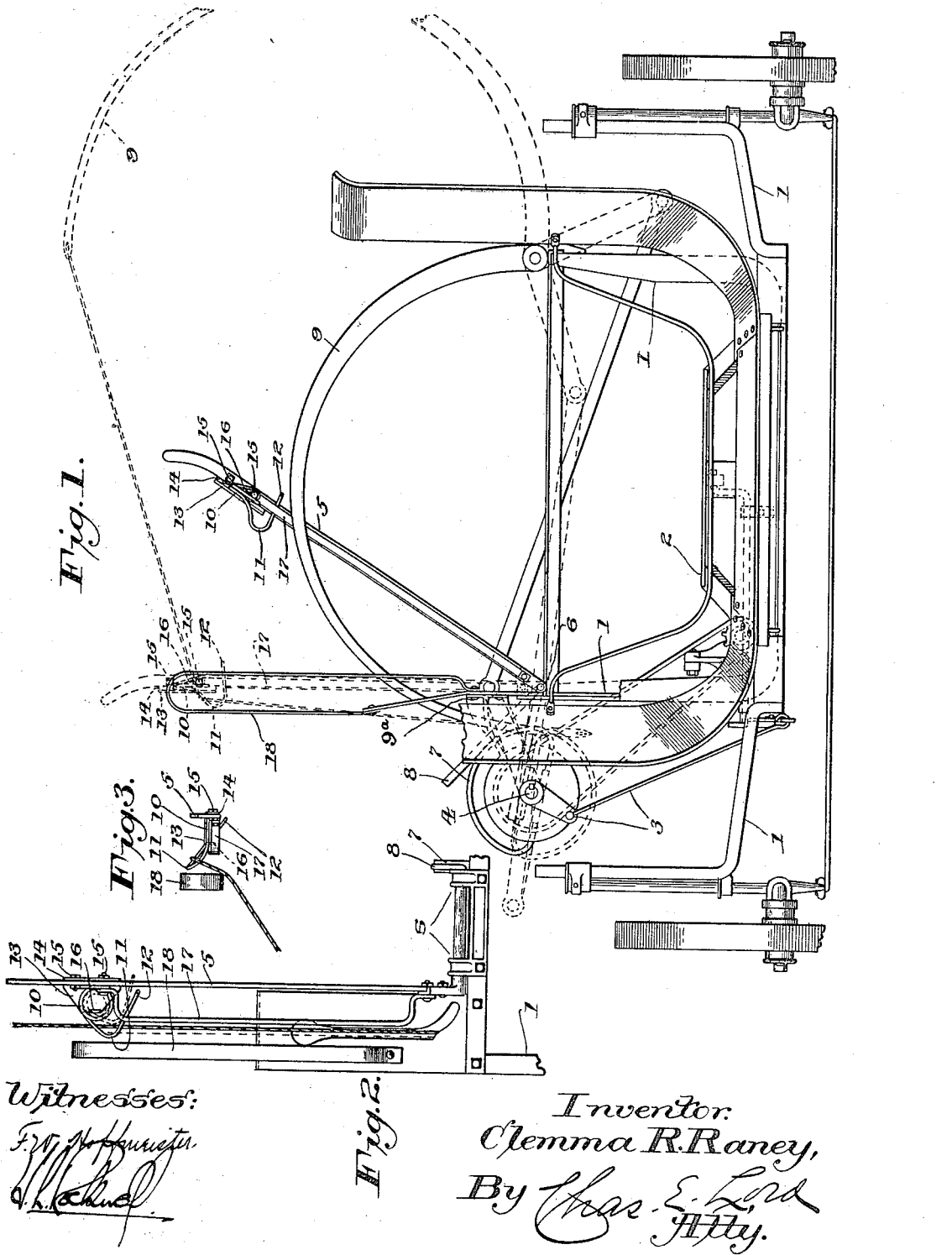
Inventor:
Clemma R. Raney,
By Chas. E. Lord
Atty.

UNITED STATES PATENT OFFICE.

CLEMMA R. RANEY, OF CHICAGO, ILLINOIS, ASSIGNOR TO INTERNATIONAL HARVESTER COMPANY OF NEW JERSEY, A CORPORATION OF NEW JERSEY.

BINDING MECHANISM.

1,205,261.  Specification of Letters Patent.  Patented Nov. 21, 1916.

Application filed May 19, 1913, Serial No. 768,463. Renewed June 8, 1916. Serial No. 102,600.

*To all whom it may concern:*

Be it known that I, CLEMMA R. RANEY, a citizen of the United States, residing at Chicago, in the county of Cook and State of Illinois, have invented certain new and useful Improvements in Binding Mechanisms, of which the following is a full, clear, and exact specification.

My invention relates to binding mechanisms.

It has among its objects to improve the construction of binding mechanisms, and especially those of the type adapted to use in connection with grain shockers, wherein a twine guide deflects the twine extending between the knotter and the binder needle out of the path of a bound shock as the latter is discharged from the machine.

A further object of my invention is to provide twine guiding and positioning means of improved construction which, when used in connection with a grain shocker, deflect the twine to the desired height and hold the same in the desired position even when the twine is struck by the tops of long sheaves in a discharged shock, but from which the twine may be readily disengaged without danger of breaking the same when in the normal operation of the machine such disengagement is desirable, as, for instance, when the first sheaf of the following shock is deposited in the shocker cradle.

A still further object of my invention is to provide a twine guide especially adapted to coöperate with a binding needle, as that of a shocker, the twine guide acting upon the twine fed out from the needle with increased efficiency and being movable into engagement with the needle without having its twine engaging and deflecting function deleteriously affected by the contact therewith.

I attain these objects by providing twine guiding and positioning means of improved construction adapted to be carried, if desired, upon the compressor arm of a shocker, which twine means coöperate with a binding needle in an improved manner and are also adapted to coöperate with a shocker frame of improved construction in such a manner as to maintain the twine in the desired elevated position thereof despite engagement of the same by the tops of the sheaves forming the shock, all as hereinafter more fully set forth.

In the accompanying drawings, I have shown one embodiment which my invention may assume in practice, illustrating the same in connection with a grain shocker of the type described and claimed in my copending application, Serial No. 742,535, filed January 17, 1913.

Figure 1 is a rear elevation of the shocker with the twine guide thereon, showing the needle in its two positions. Fig. 2 is a detail view showing the side elevation of the twine guide and the coöperating frame member. Fig. 3 is a top plan view of the twine guide and the coöperating frame member.

In the construction shown, I have illustrated a shocker mechanism of the type described and claimed in the above mentioned application comprising a wheeled frame 1 upon which reclines a rearwardly dumping shock receptacle or cradle 2 operated through link and crank connections 3 by the knotter shaft 4; a compressor arm 5 being pivoted at 6 upon the side of the frame and operated through a cam 7 on the knotter shaft, engaging with an extension 8 on the compressor arm to cause the latter to coöperate with a transversely movable needle 9, which, in turn coöperates with a knotter $9^a$ and is likewise driven from the knotter shaft; an improved twine guide hereinafter described being carried upon the compressor arm.

As shown in Fig. 1, this twine guide is in the form of a coiled spring 10 positioned upon the side of the compressor arm 5 at a point adjacent its upper end. The free end of this spring 10 is extended downward and laterally and then protruded in an opposite direction to form a resilient curved hook 11; the end 12 of which is disposed at an angle to the compressor arm 5, as shown in Fig. 3. As illustrated in Fig. 2, the coiled portion or body of this spring is attached to the outer edge of the compressor arm 5 by a suitable triangular shaped plate 13 having a flange 14 attached to the compressor arm by bolts 15 and a projection 16 on its opposite or peaked end which serves to prevent the twine from being caught in the spring when the latter is pulled forward from the position shown in Fig. 3. It is to be noted that the longitudinally extending, bowed strengthening band 17 upon the compressor arm 5 is disposed parallel to the latter throughout the greater portion of its length and terminates at a point adjacent the twine guide, the upper end of the same being attached to the compressor arm by one of the bolts 15 used to attach the twine guide and the free end 12 of the twine guide extending diagonally between the same and the compressor arm 5. It is further to be noted that a vertically extending member 18 on the machine frame protrudes upward from the body of the frame member in a plane substantially parallel with the compressor arm when in elevated postion so that the curved or hooked end of the twine guide passes close to the same and in its elevated position is back of the same, as shown in Fig. 3.

When, in the course of the operation of the shocker, the shaft 4 is rotated, rotating the cam 7, the compressor arm 8 is thrown over to compress the sheaves in the cradle and move them away from the point of the needle 9 as the latter moves downward to coöperate with the knotter 9ª. As the parts thus move downward, the needle 9 will obviously force the twine guide hook 11 out of its path, and the latter, being resilient, will return to a position above the needle as soon as the latter has passed it; the needle, the compressor arm and twine guide occupying the positions shown in full lines in Fig. 1 while the knot is being tied. In a like manner, when the needle has completed the binding operation and while both the needle and compressor are moving backward, the twine guide on the latter will be again forced out of the path of the needle. In this instance, however, it will spring back into a position in which it underlies the needle so that as the parts continue to move backward, the twine fed out from the end of the needle will be caught over the hook 11 on the twine guide 10 and elevated to the position shown in dotted lines in Fig. 1, wherein it is held out of the path of the tops of the sheaves as the cradle 2 is thrown to shock discharging position by the link and crank connection 3. Should the tops of the sheaves in the cradle strike the twine, however, as they are discharged, the twine cannot be carried off the hook and thus drawn downward in such a manner as to interfere with the operation of the machine, by reason of the fact that as the twine is pulled off rearwardly it will strike against the adjacent wall of the frame member 18, as shown in Fig. 3, and, through the coöperation of the latter with the hooked end of the guide, will be held securely thereon, the tops of the sheaves yielding as they pass it and leaving it extending across the frame above the cradle in the position shown in dotted lines in Fig. 1. When, however, the first sheaf of the next shock is deposited in the cradle, this sheaf will engage the twine and, due to the resiliency and construction of the guide, will cause the twine to be disengaged therefrom without danger of breaking the same; the twine then being pulled downward over the hook 11 and the latter yielding until it occupies the position shown in dotted lines in Fig. 2, wherein the twine is freed so that it can go to the bottom of the cradle and lie beneath the sheaves as they are piled in the latter. Obviously, when the knotter shaft 4 is again rotated, the operation of the twine guide will again be just as described, the latter operating automatically to lift the twine after each actuation of the needle.

It is to be noted that in this construction, through the coöperation of the frame member 18 and the hook shaped twine positioning member, even although the tops of the sheaves in the cradle should engage the twine, the same will be prevented from disengagement from the twine guide and will be held in the elevated position desired until the next sheaf is deposited in the cradle. It is further to be noted that due to the provision of a twine guide which is freely movable and resilient, the same is always free to move downward when the twine is carried down by this sheaf; the twine in this case slipping over the curved or hooked end of the guide. Attention is further directed to the fact that due to the provision of the projection on the guide holding plate, the twine is effectually prevented from becoming caught in the coils of the spring even when the free end of the latter is pulled forward.

While I have described one embodiment of my invention in this application, it is to be understood that this embodiment is susceptible of being modified without departing from the spirit of my invention.

What I claim as my invention and desire to secure by Letters Patent is:

1. In combination, a movable binding needle, a knotter coöperating therewith, and means including a resilient member independent of said knotter and engageable with said needle for deflecting laterally the twine fed out from said needle after each binding operation.

2. In combination, a movable binding needle, a coöperating member movable laterally with respect thereto, means for operating said elements, and a yieldable twine positioning member carried by said coöperating member protruding into the path of said needle and engageable therewith as the latter is moved.

3. In a shocking machine, a movable binding needle, a movable compressor arm, means for moving said members in substantially parallel planes, and a resilient twine engaging member carried by said compressor arm extending into the path of said needle and automatically movable out of said path by said needle.

4. In combination, a frame, a binding needle pivoted thereon, a coöperating member carried on said frame and movable laterally with respect to said needle, mechanism for operating said elements, and a resilient twine engaging hook carried on said member and engageable with said needle and the twine thereon as said needle returns from each binding operation.

5. In a shocking machine, a movable binding needle, a movable compressor arm, means for operating said members in different directions in substantially parallel planes, and a twine engaging spring attached at one end to said compressor arm and having a hook-shaped free end extending into the path of said needle and underlying the twine fed out by the latter as it returns from each binding operation.

6. In a shocking machine, a frame, a sheaf receiving cradle carried thereon, a binding needle pivoted on said frame at one side of said cradle, a coöperating compressor arm pivoted on said frame at the opposite side of said cradle, and a resilient twine guide carried on said compressor arm and extending into the path of the twine fed out from said needle.

7. In a shocking machine, a frame, a movable binding needle thereon, mechanism for moving said needle to and from binding position, twine engaging means for deflecting laterally the twine fed out from said needle as the latter moves backward after each binding operation, and supplemental means coöperating with said twine engaging means in positioning the twine against disengagement from the latter upon a lateral movement of the twine with respect thereto.

8. In a shocking machine, a frame, a movable binding needle thereon, mechanism for moving said needle to and from binding position, twine engaging means for deflecting laterally the twine fed out from said needle as the latter moves backward after each binding operation, and supplemental means carried by said frame coöperating with said twine engaging means in positioning the twine against disengagement from the latter upon a lateral movement of the twine with respect thereto.

9. In a shocking machine, a frame, a movable binding needle pivoted thereon, a movable compressor arm pivoted thereon, means for operating said members substantially simultaneously in opposite directions, an angularly disposed twine guide carried by said compressor arm and engageable with the twine on said needle as the latter returns from binding position, and means carried on said frame coöperating with said twine guide in positioning the twine against disengagement therefrom upon a lateral movement of the twine.

10. In a shocking machine, a frame, a sheaf receiving cradle carried thereon, a binding needle pivoted on said frame, a coöperating compressor arm pivoted on said frame and movable in a parallel plane to said needle, a twine guide carried by said compressor arm extending into the path of the twine fed out by said needle, and an extension on said frame coöperating with said twine guide to hold the twine thereon.

11. In a shocking machine, a frame, a movable binding needle thereon, a compressor arm on said frame, mechanism for moving the same to and from operative position, resilient twine engaging means carried on said compressor arm and extending into the path of said needle for deflecting the twine fed out from said needle after each binding operation, and a standard carried on said frame adjacent said compressor arm when the latter is in inoperative position coöperating with said twine guiding means in positioning the twine against disengagement therefrom upon a lateral movement of the twine.

12. In a shocking machine, a twine guide comprising a support, a coiled spring attached thereto and having a hook-shaped laterally protruding free end, and a plate attached to said support positioning the coiled portion of the spring thereon and having a projection protruding in an opposite lateral direction from said hook-shaped end adjacent the coiled portion of said spring.

In testimony whereof I affix my signature in the presence of two witnesses.

CLEMMA R. RANEY.

Witnesses:
RAY PATTESON,
R. W. MARTIN.